(12) United States Patent
Kinshumann et al.

(10) Patent No.: US 9,584,317 B2
(45) Date of Patent: Feb. 28, 2017

(54) IDENTIFYING SECURITY BOUNDARIES ON COMPUTING DEVICES

(71) Applicant: Microsoft Technology Licensing, LLC, Redmond, WA (US)

(72) Inventors: Kinshuman Kinshumann, Redmond, WA (US); Yevgeniy A. Samsonov, Redmond, WA (US); Niels T. Ferguson, Redmond, WA (US); Mark Fishel Novak, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/614,132

(22) Filed: Feb. 4, 2015

(65) Prior Publication Data
US 2016/0105280 A1  Apr. 14, 2016

Related U.S. Application Data

(60) Provisional application No. 62/063,294, filed on Oct. 13, 2014.

(51) Int. Cl.
*H04L 29/06* (2006.01)
*H04L 9/00* (2006.01)
(Continued)

(52) U.S. Cl.
CPC .......... *H04L 9/0825* (2013.01); *G06F 21/575* (2013.01); *H04L 9/3234* (2013.01); *H04L 9/3236* (2013.01)

(58) Field of Classification Search
CPC ........................ H04L 2209/56; H04L 63/0823
(Continued)

(56) References Cited

U.S. PATENT DOCUMENTS 7,380,119 B2  5/2008  Bade et al.
7,526,774 B1  4/2009  Beck et al.
(Continued)

FOREIGN PATENT DOCUMENTS

EP  2577539  4/2013
WO  WO-0163831  8/2001
(Continued)

OTHER PUBLICATIONS

"BIOS and Secure Boot attacks Uncovered"—Furtak et al, Intel, Feb. 2009 http://www.intelsecurity.com/resources/pr-bios-secure-boot-attacks-uncovered.pdf.*
(Continued)

*Primary Examiner* — Randy Scott
(74) *Attorney, Agent, or Firm* — Timothy Churna; Dan Choi; Micky Minhas

(57) ABSTRACT

During booting of a computing device, multiple security boundaries are generated. A security boundary refers to a manner of operation of a computing device or a portion of the computing device, with a program executing in one security boundary being prohibited from accessing data and programs in another security boundary. As part of booting the computing device measurements of (e.g., hash values or other identifications of) various modules loaded and executed as part of booting the computing device are maintained by a boot measurement system of the computing device. Additionally, as part of booting the computing device, a public/private key pair of one of the security boundaries is generated or otherwise obtained. The private key of the public/private key pair is provided to the one security boundary, and the public key of the public/private key pair is provided to the boot measurement system.

20 Claims, 5 Drawing Sheets

(51) Int. Cl.
   *H04L 9/08* (2006.01)
   *H04L 9/32* (2006.01)
   *G06F 21/57* (2013.01)

(58) Field of Classification Search
   USPC ........ 713/155, 156, 166, 168; 380/277, 278, 380/282
   See application file for complete search history.

(56) References Cited

U.S. PATENT DOCUMENTS

| | | |
|---|---|---|
| 7,587,595 B2 | 9/2009 | Scarlata et al. |
| 7,590,867 B2 | 9/2009 | Scarlata et al. |
| 7,836,299 B2 | 11/2010 | England et al. |
| 7,860,802 B2 | 12/2010 | Pandya et al. |
| 8,042,190 B2 | 10/2011 | Sahita et al. |
| 8,060,876 B2 | 11/2011 | Smith et al. |
| 8,065,713 B1 | 11/2011 | Vainstein et al. |
| 8,074,262 B2 | 12/2011 | Scarlata |
| 8,151,262 B2 | 4/2012 | Challener et al. |
| 8,208,637 B2 | 6/2012 | Ellison |
| 8,249,257 B2 | 8/2012 | Brutch et al. |
| 8,312,272 B1 | 11/2012 | Serenyi et al. |
| 8,341,427 B2 | 12/2012 | Auradkar et al. |
| 8,356,347 B2 | 1/2013 | Berger et al. |
| 8,375,221 B1 | 2/2013 | Thom et al. |
| 8,375,437 B2 | 2/2013 | Linsley et al. |
| 8,397,306 B1 | 3/2013 | Tormasov |
| 8,411,863 B2 | 4/2013 | Ureche et al. |
| 8,732,462 B2 | 5/2014 | Bhathena et al. |
| 8,812,830 B2 | 8/2014 | Raj et al. |
| 8,813,169 B2 * | 8/2014 | Shieh ................ H04L 63/0209 726/1 |
| 8,909,939 B1 | 12/2014 | Beda et al. |
| 9,172,683 B2 | 10/2015 | Farrugia et al. |
| 2001/0055396 A1 | 12/2001 | Jevans |
| 2003/0188179 A1 | 10/2003 | Challener et al. |
| 2003/0226031 A1 | 12/2003 | Proudler et al. |
| 2005/0166051 A1 | 7/2005 | Buer |
| 2006/0020781 A1 | 1/2006 | Scarlata et al. |
| 2006/0117177 A1 * | 6/2006 | Buer .................. G06F 21/606 713/155 |
| 2006/0126836 A1 | 6/2006 | Rivas |
| 2006/0155988 A1 | 7/2006 | Hunter et al. |
| 2006/0256108 A1 | 11/2006 | Scaralata |
| 2007/0016801 A1 | 1/2007 | Bade et al. |
| 2007/0094719 A1 | 4/2007 | Scarlata |
| 2008/0046581 A1 | 2/2008 | Molina et al. |
| 2008/0209221 A1 | 8/2008 | Vennelakanti et al. |
| 2008/0244569 A1 | 10/2008 | Challener et al. |
| 2009/0064292 A1 | 3/2009 | Carter et al. |
| 2009/0086979 A1 | 4/2009 | Brutch et al. |
| 2009/0125974 A1 | 5/2009 | Zhang et al. |
| 2009/0154709 A1 | 6/2009 | Ellison |
| 2009/0204964 A1 | 8/2009 | Foley et al. |
| 2009/0271618 A1 | 10/2009 | Carnenisch et al. |
| 2009/0307487 A1 | 12/2009 | Movva et al. |
| 2009/0319793 A1 | 12/2009 | Zic |
| 2010/0082960 A1 | 4/2010 | Grobman et al. |
| 2010/0083002 A1 | 4/2010 | Cui et al. |
| 2010/0178977 A1 * | 7/2010 | Kim ...................... G06F 21/51 463/25 |
| 2010/0325628 A1 | 12/2010 | Haga et al. |
| 2011/0029672 A1 | 2/2011 | Agneeswaran |
| 2011/0154031 A1 | 6/2011 | Banerjee et al. |
| 2011/0202916 A1 | 8/2011 | VoBa et al. |
| 2011/0246757 A1 | 10/2011 | Prakash et al. |
| 2011/0302415 A1 | 12/2011 | Ahmad et al. |
| 2012/0030676 A1 | 2/2012 | Smith et al. |
| 2012/0089831 A1 | 4/2012 | Rozas |
| 2012/0117565 A1 | 5/2012 | Staelin et al. |
| 2012/0204020 A1 | 8/2012 | Novak et al. |
| 2012/0265976 A1 | 10/2012 | Spiers et al. |
| 2012/0328105 A1 | 12/2012 | Mukkara et al. |
| 2013/0054979 A1 | 2/2013 | Basmov |
| 2013/0086383 A1 | 4/2013 | de Andrade et al. |
| 2013/0097296 A1 | 4/2013 | Gehrmann et al. |
| 2013/0191648 A1 | 7/2013 | Bursell |
| 2013/0227296 A1 | 8/2013 | Lee et al. |
| 2014/0006776 A1 | 1/2014 | Scott-Nash et al. |
| 2014/0007087 A1 | 1/2014 | Scott-Nash et al. |
| 2014/0019753 A1 | 1/2014 | Lowry et al. |
| 2014/0019959 A1 | 1/2014 | Dodgson et al. |
| 2014/0025961 A1 | 1/2014 | Mackintosh et al. |
| 2014/0052877 A1 | 2/2014 | Mao |
| 2014/0075494 A1 | 3/2014 | Fadida et al. |
| 2014/0089658 A1 | 3/2014 | Raghuram et al. |
| 2014/0089660 A1 | 3/2014 | Sarangshar et al. |
| 2014/0095868 A1 | 4/2014 | Korthny et al. |
| 2014/0108784 A1 | 4/2014 | Pendarakis et al. |
| 2014/0173279 A1 | 6/2014 | Goodman et al. |
| 2014/0201525 A1 | 7/2014 | Korthny et al. |
| 2014/0281497 A1 | 9/2014 | Medvinsky et al. |
| 2015/0019864 A1 | 1/2015 | Pate |
| 2015/0127795 A1 | 5/2015 | Jagana et al. |
| 2015/0134965 A1 | 5/2015 | Morenius et al. |
| 2015/0135311 A1 | 5/2015 | MacKintosh et al. |
| 2015/0143508 A1 | 5/2015 | Halibard |
| 2015/0178504 A1 | 6/2015 | Nystrom et al. |
| 2015/0188917 A1 | 7/2015 | McCarron et al. |
| 2015/0318986 A1 | 11/2015 | Novak et al. |
| 2015/0319160 A1 | 11/2015 | Ferguson et al. |
| 2016/0357988 A1 | 12/2016 | Ferguson et al. |

FOREIGN PATENT DOCUMENTS

| | | |
|---|---|---|
| WO | WO-2007087558 | 8/2007 |
| WO | WO-2009123640 | 10/2009 |
| WO | WO-2012024508 | 2/2012 |

OTHER PUBLICATIONS

"International Search Report and Written Opinion", Application No. PCT/US2015/028995, Aug. 26, 2015, 12 pages.

Novak,"Secure Transport of Encrypted Virtual Machines with Continuous Owner Access", U.S. Appl. No. 14/481,399, filed Sep. 9, 2014, 42 pages.

Novak,"Secure Creation of Encrypted Virtual Machines from Encrypted Templates", U.S. Appl. No. 14/542,341, filed Nov. 14, 2014, 67 pages.

Nystrom,"Virtual Machine Assurances", U.S. Appl. No. 14/140,214, filed Dec. 24, 2013, 55 pages.

Olzak,"Chapter 8—UEFI and the TPM: Building a foundation for platform trust", Available at: http://wayback.archive.org/web/20131018023117/http:/resources.infosecinstitute.com/uefi-and-tpm-2, Jun. 19, 2012, 16 pages.

Basit, "Approaches for Attesting Virtualized Environments", Proceedings: In Master Thesis, Royal Institute of Technology, Sweden Available at: <http://sit.sit.fraunhofer.de/smv/publications/download/AbdulBasit_Master.pdf>, 2009, 75 pages.

Berger, et al.,' "vTPM: Virtualizing the Trusted Platform Module", In Proceedings of 15th USENIX Security Symposium, Feb. 14, 2006, 16 pages.

Garfinkel, et al.,' "Terra: A Virtual Machine-Based Platform for Trusted Computing", In Proceedings of the 19th ACM Symposium on Operating System Principles, Oct. 19, 2003, 14 Pages.

Stumpf, "Enhancing Trusted Platform Modules with Hardware-Based Virtualization Techniques", In Proceedings of Second International Conference on Emerging Security Information, Systems and Technologies, Aug. 25, 2008, 9 pages.

Vax, "Securing Virtualized Environments and Accelerating Cloud Computing", In Proceedings: White Paper Available at <http://www.ca.com/~/media/files/whitepapers/managing_access_virtual_servers_wp_231691.pdf>, May 2010, 18 pages.

"International Preliminary Report on Patentability", Application No. PCT/US2015/028991, Apr. 4, 2016, 7 pages.

"International Preliminary Report on Patentability", Application No. PCT/US2014/071773, Nov. 19, 2015, 8 pages.

"International Search Report and Written Opinion", Application No. PCT/US2014/071773, Mar. 23, 2015, 10 pages.

(56) References Cited

OTHER PUBLICATIONS

"International Search Report and Written Opinion", Application No. PCT/US2015/028991, May 20, 2015, 9 pages.
"Non-Final Office Action", U.S. Appl. No. 14/542,341, May 5, 2016, 10 pages.
"Notice of Allowance", U.S. Appl. No. 14/504,096, May 25, 2016, 17 pages.
"Second Written Opinion", Application No. PCT/US2015/028995, Mar. 16, 2016, 5 pages.
Aslam,"Securely Launching Virtual Machines on Trustworthy Platforms in a Public Cloud", In Proceedings of the 2nd International Conference on Cloud D Computing and Services Science, Nov. 2012, 10 pages.
Goyette,"A Review of vTPM: Virtualizing the Trusted Platform Module", Proceedings of Network Security and Cryptography, Nov. 13, 2007, 21 pages.
"International Preliminary Report on Patentability", Application No. PCT/US2015/028995, Aug. 4, 2016, 6 pages.
"International Search Report and Written Opinion", Application No. PCT/US2016/055050, Jun. 20, 2016, 10 pages.
"International Search Report and Written Opinion", Application No. PCT/US2015/058700, Jul. 18, 2016, 10 pages.
"Non-Final Office Action", U.S. Appl. No. 14/481,399, Jun. 20, 2016, 9 pages.
"Notice of Allowance", U.S. Appl. No. 14/140,214, Aug. 18, 2016, 16 pages.
"Notice of Allowance", U.S. Appl. No. 14/542,341, Aug. 19, 2016, 5 pages.
"Second Written Opinion Issued in PCT Application No. PCT/US2015/055050", Mailed Date: Sep. 16, 2016, 5 Pages.
"Second Written Opinion Issued in PCT Application No. PCT/US2015/055050", Mailed Date: Sep. 28, 2016, 6 Pages.
"Notice of Allowance in U.S. Appl. No. 14/504,096", Mailed Date: Oct. 24, 2016, 9 pages.
"International Preliminary Report on Patentability", Application No. PCT/US2015/055050, Dec. 23, 2016, 6 pages.
"Notice of Allowance", U.S. Appl. No. 14/481,399, Jan. 5, 2017, 9 pages.

\* cited by examiner

IDENTIFYING SECURITY BOUNDARIES ON COMPUTING DEVICES

RELATED APPLICATIONS

This application claims priority to U.S. Provisional Application No. 62/063,294, filed Oct. 13, 2014, entitled "Identifying Security Boundaries on Computing Devices", the entire disclosure of which is hereby incorporated by reference herein in its entirety.

BACKGROUND

Computing devices have become commonplace in many areas of our lives. Given the number of computing devices available to us, it is oftentimes desirable to have two computing devices communicate with one another. However, situations can arise in which some parts of a computing device are trusted to receive data via communication with another device, yet other parts of the computing device are not trusted to receive such data. Allowing such communication but keeping data from parts of the computing device that are not trusted to receive the data can be difficult, leading to user dissatisfaction with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, during booting of a computing device having multiple security boundaries, a public/private key pair for a first security boundary of the multiple security boundaries is obtained. Data of the first security boundary are inaccessible to programs in a second security boundary of the multiple security boundaries. A private key of the public/private key pair is provided to an operating system module of the first security boundary, and a public key of the public/private key pair is provided to a boot measurement system of the computing device that includes a secure cryptoprocessor.

In accordance with one or more aspects, during booting of a computing device and by an operating system module of a first security boundary of multiple security boundaries of the computing device, a private key of a public/private key pair of the first security boundary is obtained. Data of the first security boundary are inaccessible to programs in a second security boundary of the multiple security boundaries, and the private key being associated with the first security boundary is not associated with other security boundaries of the computing device. The private key is used to establish a secure communication channel between the first security boundary and a remote device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
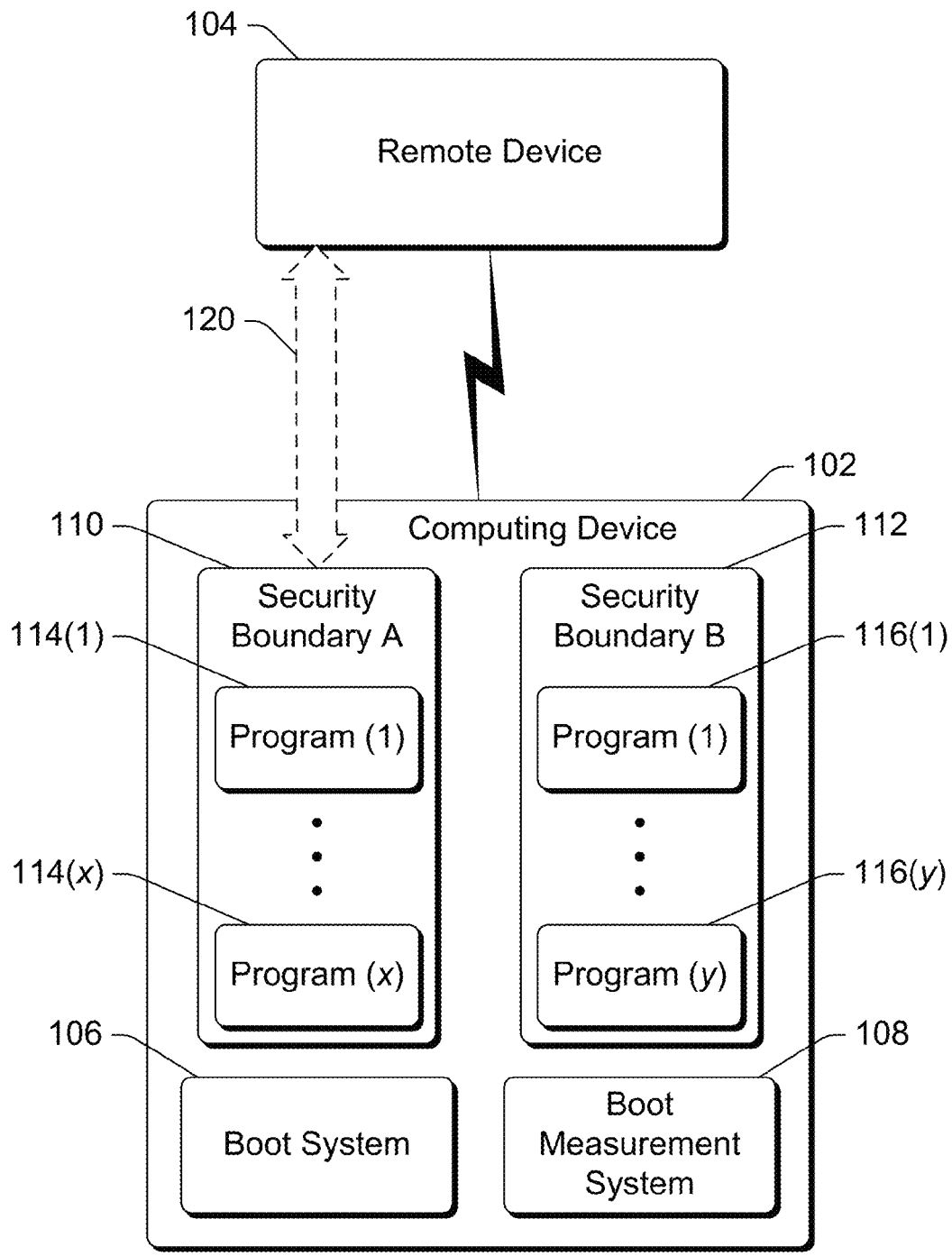
FIG. 1 illustrates an example system implementing the identifying security boundaries on computing devices in accordance with one or more embodiments.

Identifying security boundaries on computing devices is discussed herein. During booting of a computing device, multiple security boundaries are generated. A security boundary refers to a manner of operation of a computing device, or a portion of the computing device, where a program executing in one security boundary is prohibited from accessing data or programs in another security boundary. As part of a process of booting the computing device measurements of (e.g., hash values or other identifications of) various modules loaded and executed as part of booting the computing device are maintained by a boot measurement system of the computing device. Additionally, as part of the process of booting the computing device, for each of one or more of the security boundaries a public/private key pair of the security boundary is generated or otherwise obtained. The private key of the public/private key pair is provided to the security boundary, and the public key of the public/private key pair is provided to the boot measurement system.

The private key of the public/private key pair of the security boundary can be used by an operating system module or other program of the security boundary to establish a secure communication channel with a remote device. Additionally, measurements maintained by the boot measurement system, as well as knowledge the remote device has as to what measurements are expected from the security boundary and when the public/private key pair key is expected to be generated or otherwise obtained, can be used by the remote device to determine whether to trust (and establish a secure communication channel with) the security boundary. If the measurements maintained by the boot measurement system cannot be verified by the remote device, based on the remote device's knowledge of what measurements are expected from the security boundary and when the public/private key pair key is expected to be generated or otherwise obtained, the remote device does not establish a secure communication channel with the security boundary.

References are made herein to aspects of key cryptography, including symmetric key cryptography, public key cryptography, symmetric keys, and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that are encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that were signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that are encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 illustrates an example system 100 implementing the identifying security boundaries on computing devices in accordance with one or more embodiments. System 100 includes a computing device 102 that can communicate with a remote device 104. The remote device 104 is referred to as being remote due to the remote device 104 being separate (e.g., a physically separate device) from the computing device 102. The remote device 104 can be situated any distance from the computing device 102 (e.g., in the same room, in different countries, etc.).

The computing device 102 can be any of a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

The remote device 104 can also be any of a variety of different types of devices, analogous to the computing device 102. The remote device 104 and the computing device 102 can be the same types of devices or alternatively different types of devices.

The computing device 102 and the remote device 104 can communicate with one another via any of a variety of different connections. The computing device 102 and the remote device 104 can be coupled to one another via a wired or wireless connection, such as a USB (universal serial bus) connection, a wireless USB connection, an infrared connection, a Bluetooth connection, a DisplayPort connection, a PCI (a peripheral component interconnect) Express connection, and so forth. The computing device 102 and the remote device 104 can alternatively or additionally be connected to one another via a data network, such as the Internet, a local area network (LAN), a public telephone network, an intranet, other public and/or proprietary networks, combinations thereof, and so forth.

The computing device 102 includes a boot system 106 and a boot measurement system 108. When the computing device 102 is powered on or otherwise reset, the computing device 102 boots. Booting of the computing device 102 refers to the beginning operation of the computing device 102, typically loading and executing an operating system of the computing device 102. The booting of the computing device 102 includes loading and running various different modules, which in one or more embodiments are various software modules or firmware modules. These modules are illustrated as the boot system 106. These modules can include, for example, a basic input/output system (BIOS), a boot manager, and an operating system (OS) loader as discussed in more detail below. Loading of a module refers to copying the module into a volatile (or alternatively nonvolatile) memory, and optionally performing additional configurations to other modules or data stores. Executing a module refers to the running of (execution of) the instructions of the module by a processor or controller of the computing device 102. After the computing device 102 is booted, various other programs can be run on the computing device 102 by the operating system.

The boot system 106 includes multiple modules that are measured and an indication of the measurement is maintained by the boot measurement system 108. A measurement of a module refers to an identifier of the module, the identifier changing if the module changes (e.g., if instructions in the module are changed). In one or more embodiments, the measurement of a module is a hash value generated by applying a hash function (e.g., a cryptographic hash function) to the module. The boot measurement system 108 combines (e.g., hashes together) the measurements of the different modules and provides an indication of the combined measurement. This combined measurement reflects the measurements of the modules included in the boot system 106, and thus also reflects the modules in the boot system 106.

The combined measurement generated by the boot measurement system 108 can be used to verify that a particular boot system 106 is the same as a previous boot system 106 used to boot the computing device 102 (and thus that no malware was introduced into the boot system 106). For example, the combined measurement generated by the boot measurement system 108 can be made available to remote device 104. If the computing device 102 is subsequently re-booted, the combined measurement generated by the boot measurement system 108 during the re-booting can also be made available to remote device 104—if the two combined measurements are the same then the remote device 104 can be assured that the same boot system 106 was used to boot the computing device 102 each time.

The boot system 106 loads and executes one or more modules of an operating system on the computing device 102. The operating system supports one or more different security boundaries, with various programs running in the different security boundaries. The programs running in the different security boundaries include modules of the operating system, thus the operating system can be implemented in a single security boundary or across multiple security boundaries. It should be noted that multiple different instances of a program can be run concurrently, including different instances of a program being run concurrently in different security boundaries.

The computing device 102 includes two security boundaries: security boundary 110 and security boundary 112. Although two security boundaries are illustrated in FIG. 1, it should be noted that the computing device 102 can include any number of security boundaries. Multiple (x) programs 114(1), . . . , 114(x) can run in security boundary 110, and multiple (y) programs 116(1), . . . , 116(y) can run in security boundary 112. Each program 114 and 116 can be an application, a module of an operating system of the computing device 102, and so forth.

A security boundary, also referred to as a security isolation boundary or an isolation boundary, is a manner of operation of the computing device 102 (e.g., of an operating system of the computing device 102) or a portion of the computing device 102 (e.g., of an operating system of the computing device 102). An operating system of the computing device 102 or other component (e.g., virtual machine manager, hypervisor) of the computing device 102 establishes and enforces the security boundaries, prohibiting a program executing in one security boundary from accessing data and programs in another security boundary. The computing device 102 (e.g., the operating system of the computing device 102) can enforce security boundaries in any of a variety of different manners.

In one or more embodiments, a program running in one security boundary is prohibited from accessing data and programs in any other security boundary of the computing device 102 (the data and programs in any other security boundary are inaccessible to the program running in the one security boundary). For example, a program 114 running in the security boundary 110 is prohibited from accessing data in and programs running in the security boundary 112, and a program 116 running in the security boundary 112 is prohibited from accessing data in and programs running in the security boundary 110. Alternatively, situations can arise in which data is sometimes shared between different security boundaries.

For example, the security boundaries on the computing device 102 can be implemented as a hierarchy of one or more security levels, and a program running in a lower security level security boundary is prohibited from accessing data in and programs running in a higher security level security boundary. However, a program running in a higher security level security boundary is allowed to access data in and programs running in a lower security level security boundary. For example, the security boundary 112 may be a lower level security boundary (e.g., a "normal mode" security boundary), and the security boundary 110 may be a higher level security boundary (e.g., a "secure mode" security boundary). In this example, a program 116 running in the security boundary 112 is prohibited from accessing data in and programs running in the security boundary 110. However, a program 114 running in the security boundary 110 is permitted to access data in and programs running in the security boundary 112.

It should be noted that the security boundaries 110 and 112 are associated with a same user account or the same user log-in credentials for the computing device 102. The security boundaries 110 and 112 are implemented concurrently during the same user log-in session. The computing device 102 can also support multiple different user accounts or different user log-in credentials, although these different user accounts or log-in credentials are in addition to the different security boundaries. For example, multiple security boundaries can be used for each of these different user accounts or different user log-in credentials.

Public key cryptography is used to support secure communication between the remote device 104 and a security boundary of the computing device 102. As illustrated in the example of FIG. 1, a secure communication channel 120 is established between the security boundary 110 and the remote device 104. The communication channel 120 being secure refers to the communication channel 120 being between the remote device 104 and the security boundary 110, with assurance on the part of the communication channel 120 that the communication channel 120 indeed goes to the intended security boundary 110 without being spoofed or eavesdropped on.

The boot system 106, as part of establishing the security boundary 110, generates or otherwise obtains a public/private key pair of the security boundary 110. The private key of the security boundary 110 public/private key pair is provided to a program 114 of the security boundary 110 (and after being provided to the program 114 by the boot system 106 is accessible only to programs in the security boundary 110). The public key of the security boundary 110 public/private key pair can be stored elsewhere (e.g., in the boot measurement system 108). The private key of the security boundary 110 public/private key pair can be used by the remote device to establish the secure communication channel 120. Given the combined measurement generated by the boot measurement system 108 and the private key of the security boundary 110 public/private key pair, the secure communication channel 120 can be established and the remote device 104 can be assured that data communicated to the computing device 102 is communicated to the security boundary 110, and that such data are protected by the security boundary 110.

The system 100 can be used in any of a variety of different settings or environments. For example, the computing device 102 and the remote device 104 can be two different devices in a data center (e.g., a server farm). By way of another example, the remote device 104 can provide a service that is accessed by a security boundary of the computing device 102 via the Internet. By way of yet another example, the remote device 104 can be a server or data storage device situated on a same LAN (e.g., in the same office or home) as the computing device 102.

Figure 2:
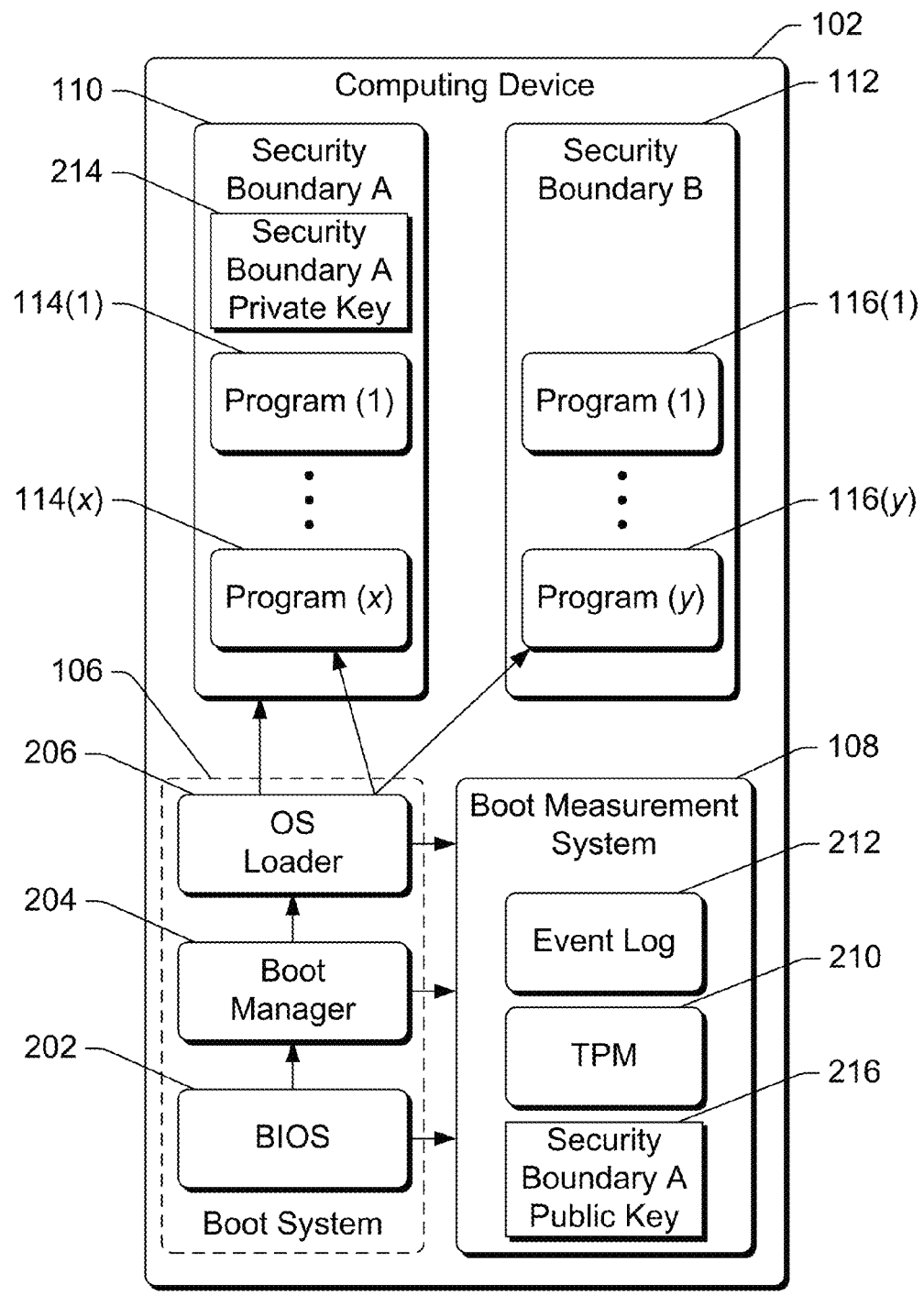
FIG. 2 illustrates the computing device in additional detail in accordance with one or more embodiments.

FIG. 2 illustrates the computing device 102 in additional detail in accordance with one or more embodiments. The computing device 102 includes the boot system 106, the boot measurement system 108, the security boundary 110, and the security boundary 112 as discussed above. The boot system 106 includes a BIOS 202, a boot manager 204, and an OS loader 206, each of which is made up of one or more modules.

The boot measurement system 108 includes a secure cryptoprocessor that is a trusted platform module (TPM) 210. The TPM 210 can be a physical device or a virtual device. The TPM 210 includes various functionality, such as key generation, encryption, decryption, secure storage (e.g., platform configuration registers), and so forth. In one or more embodiments, the TPM 210 conforms to the Trusted Computing Group Trusted Platform Module specification version 1.2, published as the ISO/IEC 11889 Information technology—Trusted Platform Module specification (2009), Parts 1-4. Although discussed herein with reference to TPM 210, the boot measurement system 108 can alternatively use one or more other cryptoprocessors that provide functionality similar to the TPM.

During operation, when booting the computing device 102, multiple modules are loaded and executed. The first module that is loaded generates (or obtains) a measurement of itself and provides the measurement to the boot measurement system 108. The measurement is loaded into the TPM 210 and is also recorded in an event log 212, which is a file (e.g., a text file) or other record of measurements. It should be noted that the event log 212 can be an unprotected log (e.g., unencrypted and accessible to any module of the computing device 102) that has a copy of all the measurements that go into the TPM.

The first module loaded when booting the computing device 102 also generates a measurement of the next module to be loaded on the computing device 102, provides the measurement to the boot measurement system 108 (which loads the measurement into the TPM 210 and records the measurement in the event log 212), and transfers control to the next module. This process can be repeated for any number of modules in the boot system 106, with each module generating a measurement of the next module to be loaded on the computing device 102, providing the measurement to the boot measurement system 108 (which loads the measurement into the TPM 210 and records the measurement in the event log 212), and transferring control to the next module.

The TPM 210 combines the measurements it receives to generate a combined measurement. The measurements can be combined in various different manners, such as by concatenating and hashing the measurements. For example, an initial measurement A received by the TPM 210 can be maintained by the TPM 210. When the next measurement B is received, a combined measurement can be generated by concatenating the initial measurement A and the next measurement B and generating a hash value by applying a one-way function (e.g., a cryptographic hash function) to the concatenated value to generate a combined measurement. When the next measurement C is received, a new combined measurement can be generated by concatenating the previous combined measurement and the next measurement C and generating a hash value by applying a one-way function (e.g., a cryptographic hash function) to the concatenated value to generate a new combined measurement. Alternatively, the TPM 210 can combine the measurements in any of a variety of other manners.

After all the modules of the boot system 106 are loaded on the computing device 102, the combined measurement in the TPM 210 is an indication of the modules that were loaded and the sequence of the loading of those modules. The combined measurement in the TPM 210 can also include an indication of the configuration that affects execution of the modules that were loaded (e.g., boot configuration data (BCD) settings). If the modules that are loaded (and their configurations) and the sequence of the loading of those modules is the same for different boots, then the combined measurements for the different boots will be the same. Each time the computing device 102 is re-booted, the combined measurement in the TPM 210 is expected to have the same value. If the value changes between boots, then it can be assumed that some change to the boot system 106 was made (e.g., a module was not loaded, a module was changed, an additional module was loaded, modules were loaded in a different order, the same modules were loaded but with different configurations, etc.).

Additionally, one or more modules of the boot system 106 generate a public/private key pair (or alternatively obtain a previously generated public/private key pair, as discussed in more detail below) for at least one of the security boundaries 110 and 112. In one or more embodiments the public/private key pair for a security boundary is generated when a module of the boot system 106 is setting up (establishing) the security boundary. The private key of the public/private key pair for a security boundary is provided to a program of the security boundary (e.g., to an operating system module of the security boundary), and the public key of the public/private key pair for the security boundary is stored elsewhere (e.g., in the boot measurement system 108). A record of the generation of the public/private key pair is also maintained in the event log 212 (the public key of the public/private key pair can optionally be maintained in the event log 212). For example, a public/private key pair is generated for the security boundary 110, and the private key 214 of the public/private key pair is provided to one or more programs 114 of the security boundary 110, and the public key 216 of the public/private key pair is provided to the boot measurement system 108.

The public key 216 is also provided to the TPM 210, which can combine the public key 216 with the measurements received for the modules of the boot system 106 in any of a variety of different manners. For example, the public key 216 can be treated by the TPM 210 as if the public key 216 were a measurement of a module of the boot system 106, and a hash value can be generated by applying a one-way function to a concatenation of the public key 216 and the previous combined measurement.

After the private key 214 is available to one or more programs 114 in the security boundary 110, a remote device (e.g., the remote device 104) can establish a secure communication channel with a program 114 in the security boundary 110 and be assured that the program 114 is actually a program in the security boundary 110. The point during the booting of the computing device 102 at which the security boundary 110 is to be generated and the point during the booting of the computing device 102 at which the public/private key pair is to be generated are known to the remote device. These points can be known as a result of various actions or events, such as previous communication with the computing device 102, knowledge made available by a distributor of the boot system 106, and so forth.

The remote device can request from the computing device 102 (e.g., a program 114 in the security boundary 110) and receive in response to the request a copy of the event log 212. The remote device can examine the event log 212 and verify that the security boundary 110 was generated at the point during the booting of the computing device 102 that the remote device expected the security boundary 110 to be generated, and verify that the public/private key pair was generated at the point during the booting of the computing device 102 that the remote device expected the public/private key pair to be generated. The remote device can also generate a combined measurement, based on the event log 212, in the same manner as the combined measurement was generated by the TPM 210, and verify that the combined measurement of the modules (and configuration) of the boot system 106 maintained in the TPM 210 at the point at which the security boundary 110 is generated is the same as the combined measurement generated by the remote device. Some proof that the combined measurement generated by the TPM 210 has a particular value can also be provided to the remote device, such as by the TPM 210 digitally signing the combined measurement generated by the TPM 210 using a private key of a public/private key pair of the TPM 210.

The remote device can then attempt to establish a secure communication channel with the security boundary 110 (e.g., with a program 114 of the security boundary 110) using the public key of the public/private key pair of the security boundary 110, and if successful the remote device knows that the security boundary 110 is in possession of the private key of the public/private key pair of the security boundary 110. With the verifications discussed above (that the security boundary 110 was generated at the point during the booting of the computing device 102 that the remote device expected the security boundary 110 to be generated, and that the public/private key pair was generated at the point during the booting of the computing device 102 that the remote device expected the public/private key pair to be generated), the remote device also knows that the security boundary 110 was generated at the expected time during the booting of the computing device 102, and that no changes were made to the boot system 106 (otherwise, the combined measurement value would not be verified). By the nature of trust of the code being executed in the boot system and the security boundary 110 (verified as discussed above), the remote device is also assured that the private key of the public/private key pair of the security boundary 110 is only available to programs inside the security boundary 110.

The secure communication channel can be established based on the public/private key pair of the security boundary 110 and a public/private key pair of the remote device using any of a variety of public or proprietary techniques. For example, the secure communication channel can be established using the Transport Layer Security (TLS) protocol, the Secure Sockets Layer (SSL) protocol, and so forth.

The following illustrates a more specific example of the booting of the computing device 102. Upon a power up or a reset event, control is passed to the BIOS 202, which performs hardware initialization and eventually proceeds to launch the boot manager 204. However, before the boot manager 204 starts executing, the code of the boot manager is measured by the BIOS 202 and stored in the TPM 210 and the event log 212. The boot manager 204 then executes, decides on what particular operating system to start (in situations in which there are multiple operating systems that could be started), and loads and transfers control to the OS loader 206. However, before passing control to the OS loader 206, the code of the OS loader 206 is measured by the boot manager 204, which provides the measurement to the TPM 210 (which generates a combined measurement) and the event log 212. The OS loader 206 creates the appropriate trust boundaries as supported by the operating system and pre-populates those boundaries with an initial set of operating system modules (ones of the programs 114 and 116) to be executed later. Each of those operating system modules is measured by the OS loader 206, which provides the measurements to the TPM 210 (which generates a combined measurement) and the event log 212. The OS loader 206 also generates a new public/private key pair for the security boundary 110. Any of a variety of different algorithms can be used to generate the public/private key pair, such as RSA (Rivest, Shamir, Adleman) or ECC (elliptic curve cryptography) algorithms. The OS loader 206 provides the public key of the public/private key pair to the TPM 210 (which combines the public key with the other received measurements) and the event log 212, and the private key of the public/private key pair to the security boundary 110 (e.g., one of the operating system modules populated by the OS loader 206). The OS loader 206 then passes control to an OS module in one of the security boundaries 110 or 112.

In the discussions above, reference is made to the public/private key pair of a security boundary being generated during the booting of the computing device 102. Alternatively, the public/private key pair can be saved in a manner that allows the public/private key pair to be retrieved during a subsequent boot without having to re-generate the public/private key pair, but only if the state of the boot system 106 is the same at the point at which at least the private key of the public/private key pair is decrypted during the subsequent boot as the state of the boot system 106 at the point at which at least the public key of the public/private key pair was encrypted (e.g., the combined measurement at the point at which the public/private key pair is being retrieved is the same as the combined measurement at the point at which the public/private key pair was previously saved). It should be noted that at least the private key of the public/private key pair is encrypted and decrypted—the public key of the public/private key pair can be, but need not be, encrypted and decrypted. In one or more embodiments, this state of the boot system 106 is security-sensitive state (state which reflects the security of the boot system 106, such as which modules of the boot system 106 were loaded and/or the order the modules of the boot system 106 were loaded) and need not include all state of the boot system 106. The component or module performing the encrypting of at least the private key of the public/private key pair and saving at least the encrypted private key can determine which state is the security-sensitive state.

In one or more embodiments, the public/private key pair is saved by the OS loader 206 sealing the public/private key pair to a set of TPM platform configuration registers that represent the security state of the computing device 102. Sealing the public/private key pair refers to encrypting at least the private key of the public/private key pair such that at least the private key of the public/private key pair is only decrypted (unsealed) by the TPM if the TPM platform configuration registers have the same values at the time of decryption as they had at the time of encryption. Such sealing of the public/private key pair can be performed in any of a variety of different manners, such as in accordance with the Trusted Computing Group Trusted Platform Module specification version 1.2. The TPM can determine which state of the boot system 106 is the security-sensitive state (e.g., which TPM platform configuration registers to seal the public/private key pair to). The encrypted at least private key (and optionally public key) of the public/private key pair can be stored on and subsequently retrieved from any storage media available to the OS loader 206. If the computing device 102 security state changes (as indicated by changed PCR values), the unseal of the public/private key pair will fail, and the OS loader 206 will generate a new public/private key pair. Additionally, if the unseal of the public/private key pair fails, the OS loader 206 optionally advises the remote device (e.g., the remote device 104 of FIG. 1) to re-evaluate its assessment of the computing device 102 security state before again trusting the OS loader 206 to properly setup the security boundaries.

It should also be noted that although two security boundaries 110 and 112 are illustrated in FIG. 2, the computing device 102 can include any number (three or more) of security boundaries. It should further be noted that although a public/private key pair for a single security boundary (security boundary 110) is illustrated in FIG. 2, each security boundary can have its own public/private key pair (with the private key of the public/private key pair of a security boundary being maintained by that security boundary, and the public key of the public/private key pair of the security boundary being maintained by the boot measurement system 108).

Figure 3:
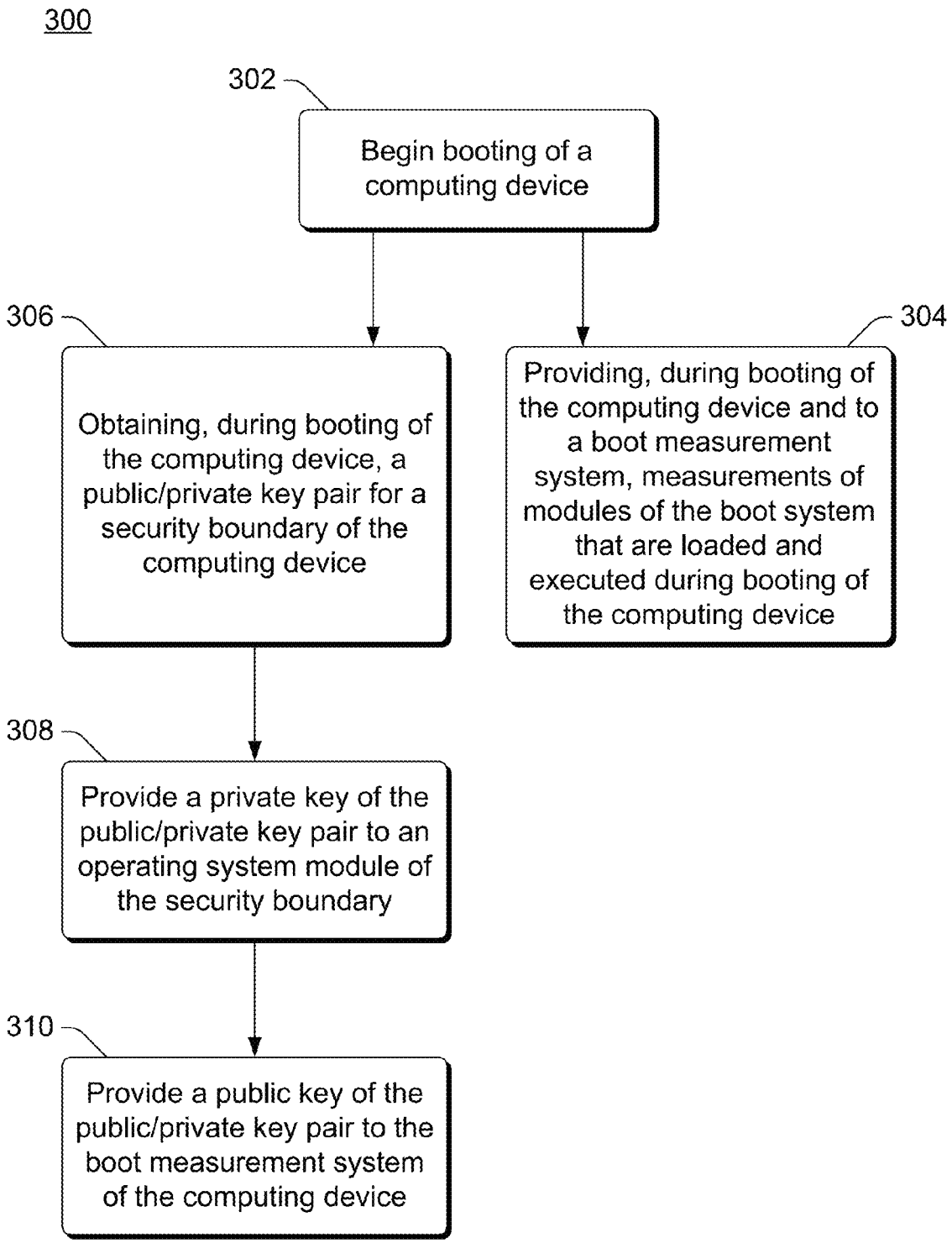
FIG. 3 is a flowchart illustrating an example process for booting a computing device in accordance with one or more embodiments.

FIG. 3 is a flowchart illustrating an example process 300 for booting a computing device in accordance with one or more embodiments. Process 300 is carried out by a computing device, such as the computing device 102 of FIG. 1 or FIG. 2, and can be implemented in software, firmware, hardware, or combinations thereof. Process 300 is shown as a set of acts and is not limited to the order shown for performing the operations of the various acts. Process 300 is an example process for booting a computing device; additional discussions of booting a computing device are included herein with reference to different figures.

In process 300, booting of the computing device begins (act 302). Booting of the computing device refers to the beginning operation of the computing device, typically loading and executing an operating system of the computing device as discussed above.

During booting of the computing device, measurements of modules of the boot system that are loaded and executed during booting of the computing device are provided to a boot measurement system (act 304). The boot system can include various modules used to boot the computing device, such as a BIOS, boot manager, and OS loader as discussed above. The measurements provided to the boot measurement system are included in an event log of the boot measurement system, and reflected in a secure cryptoprocessor (e.g., a TPM) of the boot measurement system.

Additionally, during booting of the computing device, a public/private key pair for a security boundary of the computing device is obtained (act 306). This public/private key pair can be obtained by being generated or by decrypting at least the private key of a previously generated public/private key pair as discussed above.

The private key of the public/private key pair is provided to an operating system module of the security boundary (act 308). The public key of the public/private key pair is provide to the boot measurement system of the computing device (act 310).

Figure 4:
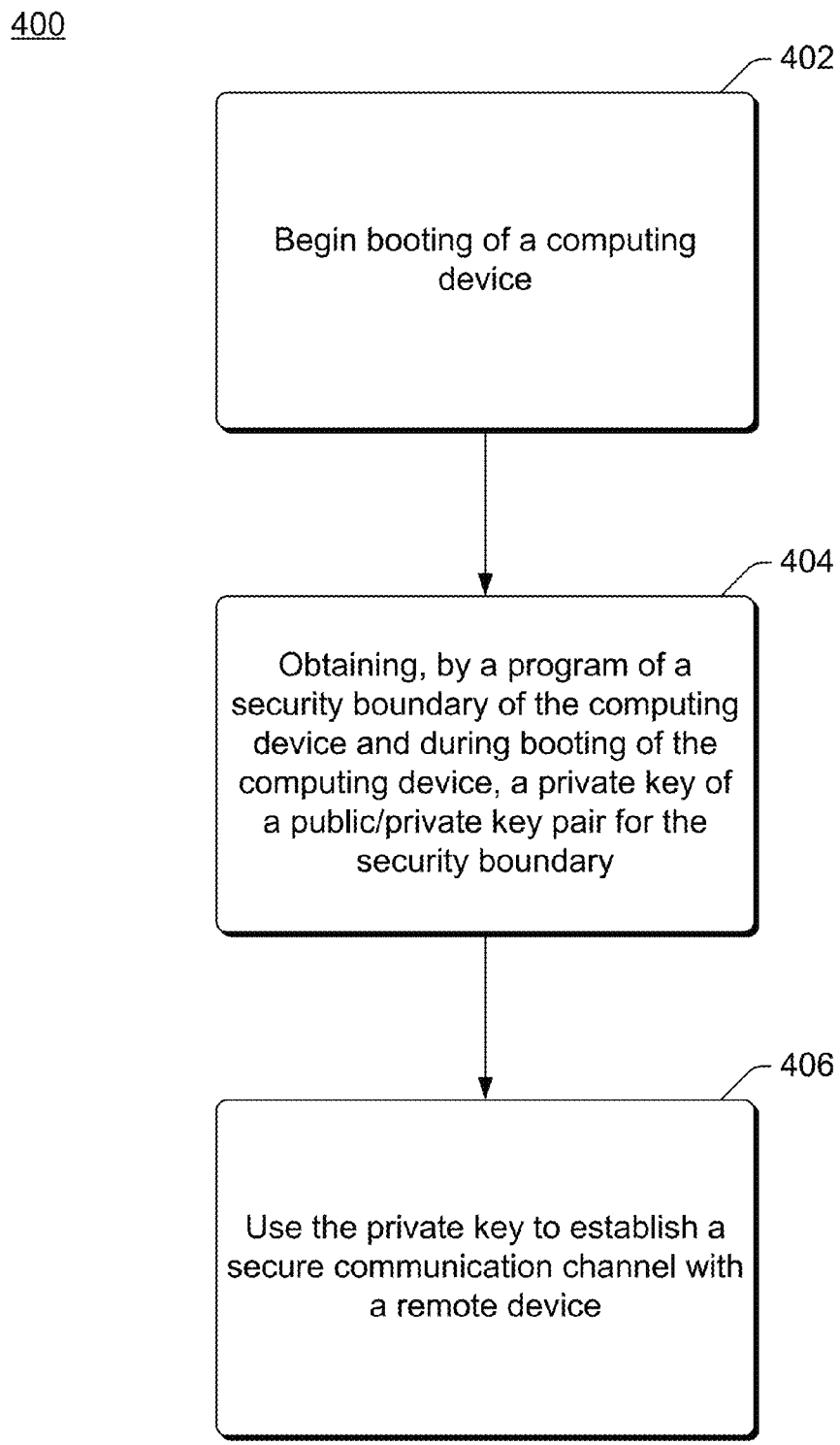
FIG. 4 is a flowchart illustrating an example process for operation of a security boundary in accordance with one or more embodiments.

FIG. 4 is a flowchart illustrating an example process 400 for operation of a security boundary in accordance with one or more embodiments. Process 400 is carried out by a computing device, such as the computing device 102 of FIG. 1 or FIG. 2, and can be implemented in software, firmware, hardware, or combinations thereof. Process 400 is shown as a set of acts and is not limited to the order shown for performing the operations of the various acts. Process 400 is an example process for operation of a security boundary; additional discussions of operation of a security boundary are included herein with reference to different figures.

In process 400, booting of the computing device begins (act 402). Booting of the computing device refers to the beginning operation of the computing device, typically loading and executing an operating system of the computing device as discussed above. This booting includes creating the security boundaries and loading one or more operating system modules into at least one of the security boundaries.

During booting of the computing device, a private key of a public/private key pair for a security boundary is obtained by a program of the security boundary (act 404). The program of the security boundary is a program running in the security boundary, such as an operating system. The private key obtained by the program in act 404 is the private key that was generated or otherwise obtained by a module of the boot system (e.g., the OS loader) as discussed above.

The private key is used to establish a secure communication channel with a remote device (act 406). The private key can be used in any of a variety of public or proprietary manners for any of a variety of different protocols to establish and maintain a secure communication channel between the remote device and the security boundary.

As discussed above, security boundary is a manner of operation of a computing device or a portion of the computing device, and a program executing in one security boundary is prohibited from accessing data or programs in another security boundary. The security boundaries can be implemented in any of a variety of different manners. For example, the security boundaries can be implemented using different operational modes or rings of a processor, and the different security boundaries corresponding to different operational modes or rings of a processor.

Alternatively, the security boundaries can be implemented using one or more virtual machines. A virtual machine manager or hypervisor can establish a virtual machine, and a virtual processor of the virtual machine can have different virtual trust levels (each virtual trust level being a different security boundary). A virtual machine refers to a software implementation of a physical computing device (or other machine or system) that can run programs analogous to a physical computing device. The virtual machine includes one or more virtual components that are similar to (but are software implementations of) components of the physical computing device. An operating system as well as other applications can execute using the virtual components as they would using the components of the physical computing device, including running on virtual processors or virtual processor cores, accessing virtual memory, and so forth. The operating system and other applications executing in the virtual machine need have no knowledge, and typically have no knowledge, that they are executing in a virtual machine.

The virtual machine manager can implement a virtual secure mode that makes multiple different virtual trust levels available to virtual processors of a virtual machine. The virtual trust level is an execution environment for a virtual processor, and each virtual processor can enter or exit a virtual trust level independent of any other virtual processors.

Each virtual trust level has associated with it a set of memory access protections. Different virtual trust levels can have different sets of access protections, and the set of access protections of a virtual trust level can be used to limit what memory can be accessed and/or how the memory can be accessed when the virtual processor is running in that virtual trust level.

Each virtual trust level also has associated with it a virtual processor state. The virtual processor state refers to various different register settings, configuration values, and so forth of the virtual processor. Separate virtual processor state is maintained for different virtual trust levels, preventing one virtual trust level from accessing the processor state of another virtual trust level. Although some virtual processor state is maintained separately for different virtual trust levels (also referred to as private processor state), other processor state (also referred to as shared processor state) can be shared across multiple virtual trust levels as discussed in more detail below.

Each virtual trust level also has associated with it an interrupt subsystem. The interrupt subsystem refers to various different modules, programs, settings, and so forth for managing interrupts for the virtual processor. Separate interrupt subsystems are maintained for different virtual trust levels, allowing interrupts to be managed securely at one virtual trust level while preventing programs running at another (e.g., lower as discussed in more detail below) virtual trust level from generating unexpected interrupts or masking interrupts.

The virtual trust levels are organized as a hierarchy with a higher level virtual trust level being more privileged than a lower virtual trust level, and the lower virtual trust level being less privileged than the higher virtual trust level. A program running on the virtual processor operating in a virtual trust level that is more privileged than another virtual trust level can restrict access to memory locations by programs or devices that are operating in that other virtual trust level. A program running on the virtual processor can also optionally change memory access protections for the virtual trust level at which the virtual processor is running. However, a program running on the virtual processor operating in a virtual trust level that is less privileged than another virtual trust level cannot restrict access to memory locations by programs or devices that are operating in that other virtual trust level.

The security boundaries in a computing device can be hierarchical (also referred to as nested) in nature, side-by-side (also referred to as not nested) in nature, or combinations thereof. In the various discussions herein referring to security boundaries, the security boundaries being referred to can be hierarchical, side-by-side, or combinations thereof.

The techniques discussed herein support various different usage scenarios. For example, a remote device can be given an assurance that any data that the remote device provides to a program in a security boundary will be under control of that security boundary, and will only be made available outside of the security boundary if a program inside the storage device determines it is permissible to do so. Reliability and security of the computing device 102 are thus both advantageously enhanced because the remote device can be assured that it is communicating with a program running inside a particular security boundary of the computing device rather than other programs (e.g., malicious code) running on the computing device.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
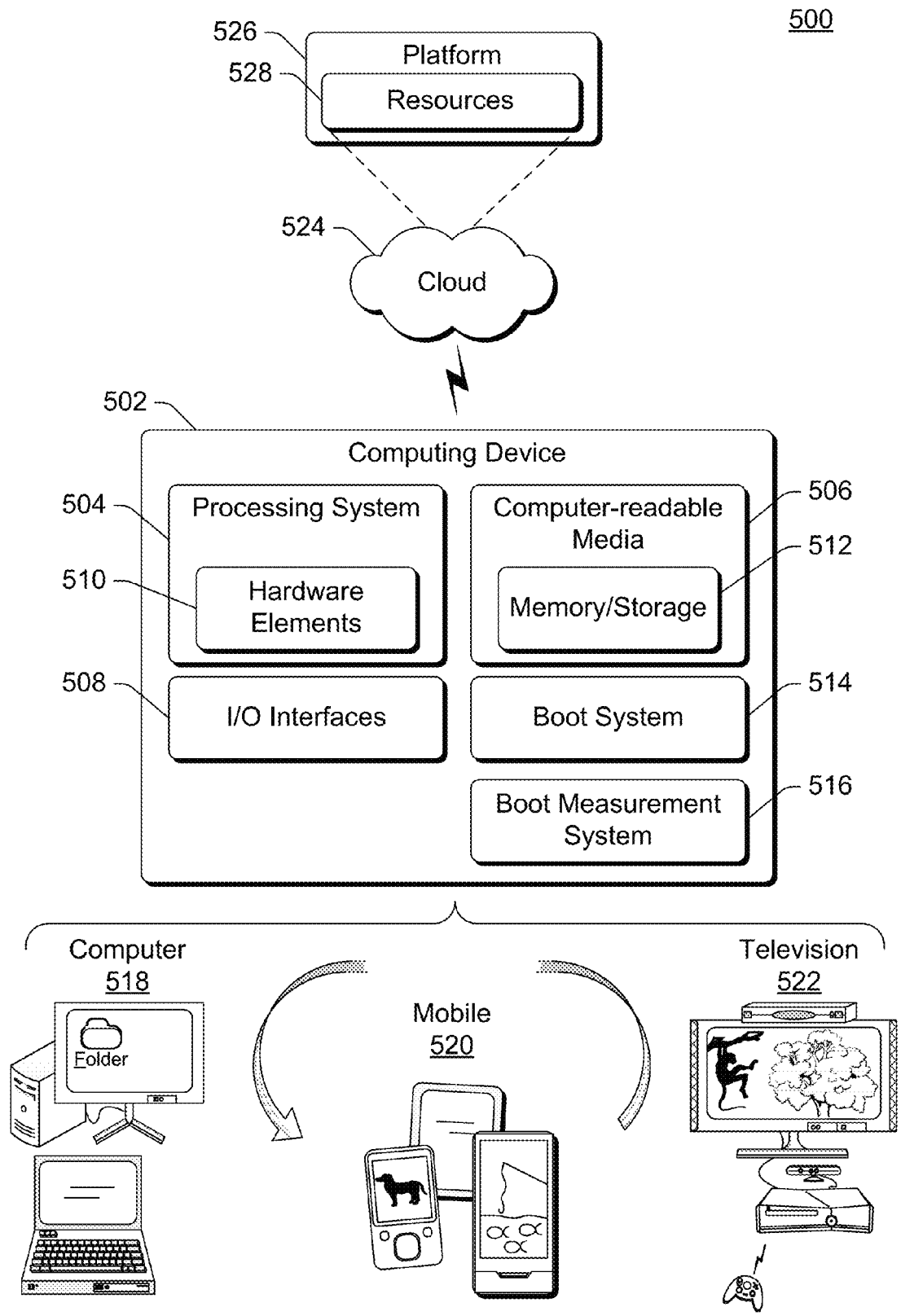
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a boot system 514 and a boot measurement system 516. The boot system 514 and boot measurement system 516 provide various functionality discussed herein, including generating and maintaining measurements of modules of the boot system 514, generating or otherwise obtaining public/private key pairs for security boundaries, and so forth as discussed above. The boot system 514 and the boot measurement system 516 can implement, for example, the boot system 106 and the boot measurement system 108, respectively, of FIGS. 1 and 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 518, mobile 520, and television 522 uses. Each of these configurations includes devices that may have generally different constructs and capabilities, and thus the computing device 502 may be configured according to one or more of the different device classes. For instance, the computing device 502 may be implemented as the computer 518 class of a device that includes a personal computer, desktop computer, a multi-screen computer, laptop computer, netbook, and so on.

The computing device 502 may also be implemented as the mobile 520 class of device that includes mobile devices, such as a mobile phone, portable music player, portable gaming device, a tablet computer, a multi-screen computer, and so on. The computing device 502 may also be implemented as the television 522 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 524 via a platform 526 as described below.

The cloud 524 includes and/or is representative of a platform 526 for resources 528. The platform 526 abstracts underlying functionality of hardware (e.g., servers) and software resources of the cloud 524. The resources 528 may include applications and/or data that can be utilized while computer processing is executed on servers that are remote from the computing device 502. Resources 528 can also include services provided over the Internet and/or through a subscriber network, such as a cellular or Wi-Fi network.

The platform 526 may abstract resources and functions to connect the computing device 502 with other computing devices. The platform 526 may also serve to abstract scaling of resources to provide a corresponding level of scale to encountered demand for the resources 528 that are implemented via the platform 526. Accordingly, in an interconnected device embodiment, implementation of functionality described herein may be distributed throughout the system 500. For example, the functionality may be implemented in part on the computing device 502 as well as via the platform 526 that abstracts the functionality of the cloud 524.

In the discussions herein, various different embodiments are described. It is to be appreciated and understood that each embodiment described herein can be used on its own or in connection with one or more other embodiments described herein. Any of the devices, methods, and so forth discussed herein can be used in conjunction with any other devices, methods, and so forth discussed herein. Further aspects of the techniques discussed herein relate to one or more of the following embodiments.

A method implemented in a computing device, the method comprising: obtaining, during booting of the computing device having multiple security boundaries, a public/private key pair for a first security boundary of the multiple security boundaries, data of the first security boundary being inaccessible to programs in a second security boundary of the multiple security boundaries; providing a private key of the public/private key pair to an operating system module of the first security boundary; and providing a public key of the public/private key pair to a boot measurement system of the computing device that includes a secure cryptoprocessor.

Alternatively or in addition to the above described method, any one or combination of: the obtaining the public/private key pair comprising generating the public/private key pair; the obtaining the public/private key pair comprising decrypting at least the private key of a previously generated public/private key pair only if a security-sensitive state of a boot system of the computing device at a point at which at least the private key of the public/private key pair is decrypted and a security-sensitive state of a boot system of the computing device at a point at which at least the private key of the public/private key pair was previously encrypted are the same security-sensitive state; the obtaining the public/private key pair comprising obtaining the public/private key pair at a time of creating the first security boundary; the obtaining the public/private key pair comprising obtaining the public/private key pair prior to creation of the first security boundary; the secure cryptoprocessor comprising a trusted platform module physical device; further comprising using the private key of the public/private key pair to establish a secure communication channel between the first security boundary and a remote device; further comprising providing an event log identifying modules loaded and executed during the booting of the computing device to the remote device; further comprising: obtaining, during booting of the computing device, a public/private key pair for a third security boundary of the multiple security boundaries, data of the third security boundary being inaccessible to programs in the first security boundary and programs in the second security boundary, providing a private key of the public/private key pair for the third security boundary to an operating system module of the third security boundary, and providing a public key of the public/private key pair for the third security boundary to the secure cryptoprocessor of the computing device.

A method implemented in a computing device, the method comprising: obtaining, during booting of the computing device and by an operating system module of a first security boundary of multiple security boundaries of the computing device, a private key of a public/private key pair of the first security boundary, data of the first security boundary being inaccessible to programs in a second security boundary of the multiple security boundaries, the private key being associated with the first security boundary but not being associated with other security boundaries of the computing device; and using the private key to establish a secure communication channel between the first security boundary and a remote device.

Alternatively or in addition to any of the above described methods, any one or combination of: the obtaining the private key comprises receiving the private key from a module of a boot system of the computing device at a time of creating the first security boundary; the private key having been generated by a module of a boot system of the computing device prior to creation of the first security boundary; further comprising providing an event log identifying modules loaded and executed during the booting of the computing device to the remote device.

A computing device comprising: a processing system comprising one or more processors; and one or more computer-readable storage media having stored thereon multiple instructions that, responsive to execution by the processing system, cause the processing system to perform acts comprising: obtaining, during booting of the computing device, a public/private key pair for a first security boundary of multiple security boundaries of the computing device, data of the first security boundary being inaccessible to programs in a second security boundary of the multiple security boundaries; providing a private key of the public/private key pair to a program of the first security boundary; and providing a public key of the public/private key pair to a boot measurement system of the computing device that includes a secure cryptoprocessor.

Alternatively or in addition to the above described computing device, any one or combination of: the obtaining the public/private key pair comprising generating the public/private key pair; the obtaining the public/private key pair comprising decrypting at least the private key of a previously generated public/private key pair only if a security-sensitive state of a boot system of the computing device at a point at which at least the private key of the public/private key pair is decrypted and a security-sensitive state of a boot system of the computing device at a point at which at least the private key of the public/private key pair was encrypted are the same security-sensitive state; the obtaining the public/private key pair comprising obtaining the public/private key pair at a time of creating the first security boundary; the obtaining the public/private key pair comprising obtaining the public/private key pair prior to creation of the first security boundary; the secure cryptoprocessor comprising a trusted platform module physical device; further comprising using the private key of the public/private key pair to establish a secure communication channel between the first security boundary and a remote device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    obtaining, during booting of the computing device having multiple security boundaries, a public/private key pair for a first security boundary of the multiple security boundaries, data of the first security boundary being inaccessible to programs in a second security boundary of the multiple security boundaries;
    providing a private key of the public/private key pair to an operating system module of the first security boundary;
    providing a public key of the public/private key pair to a boot measurement system of the computing device that includes a secure cryptoprocessor; and
    using the private key of the public/private key pair to establish a secure communication channel between the first security boundary and a remote device.

2. The method as recited in claim 1, the obtaining the public/private key pair comprising generating the public/private key pair.

3. The method as recited in claim 1, the obtaining the public/private key pair comprising decrypting at least the private key of a previously generated public/private key pair only if a security-sensitive state of a boot system of the computing device at a point at which at least the private key of the public/private key pair is decrypted and a security-sensitive state of a boot system of the computing device at a point at which at least the private key of the public/private key pair was previously encrypted are the same security-sensitive state.

4. The method as recited in claim 1, the obtaining the public/private key pair comprising obtaining the public/private key pair at a time of creating the first security boundary.

5. The method as recited in claim 1, the obtaining the public/private key pair comprising obtaining the public/private key pair prior to creation of the first security boundary.

6. The method as recited in claim 1, the secure cryptoprocessor comprising a trusted platform module physical device.

7. The method as recited in claim 1, further comprising providing an event log identifying modules loaded and executed during the booting of the computing device to the remote device.

8. The method as recited in claim 1, further comprising:
    obtaining, during booting of the computing device, a public/private key pair for a third security boundary of the multiple security boundaries, data of the third security boundary being inaccessible to programs in the first security boundary and programs in the second security boundary;
    providing a private key of the public/private key pair for the third security boundary to an operating system module of the third security boundary; and
    providing a public key of the public/private key pair for the third security boundary to the secure cryptoprocessor of the computing device.

9. A method implemented in a computing device, the method comprising:
    obtaining, during booting of the computing device and by an operating system module of a first security boundary of multiple security boundaries of the computing device, a private key of a public/private key pair of the first security boundary, data of the first security boundary being inaccessible to programs in a second security boundary of the multiple security boundaries, the private key being associated with the first security boundary but not being associated with other security boundaries of the computing device; and
    using the private key to establish a secure communication channel between the first security boundary and a remote device.

10. The method as recited in claim 9, the obtaining the private key comprises receiving the private key from a module of a boot system of the computing device at a time of creating the first security boundary.

11. The method as recited in claim 9, the private key having been generated by a module of a boot system of the computing device prior to creation of the first security boundary.

12. The method as recited in claim 9, further comprising providing an event log identifying modules loaded and executed during the booting of the computing device to the remote device.

13. A computing device comprising:
    a processing system comprising one or more processors; and
    one or more computer-readable storage media having stored thereon multiple instructions that, responsive to execution by the processing system, cause the processing system to perform acts comprising:
    obtaining, during booting of the computing device, a public/private key pair for a first security boundary of multiple security boundaries of the computing device, data of the first security boundary being inaccessible to programs in a second security boundary of the multiple security boundaries;
    providing a private key of the public/private key pair to a program of the first security boundary;
    providing a public key of the public/private key pair to a boot measurement system of the computing device that includes a secure cryptoprocessor; and
    using the private key of the public/private key pair to establish a secure communication channel between the first security boundary and a remote device.

14. The computing device as recited in claim 13, the obtaining the public/private key pair comprising generating the public/private key pair.

15. The computing device as recited in claim 13, the obtaining the public/private key pair comprising decrypting at least the private key of a previously generated public/private key pair only if a security-sensitive state of a boot system of the computing device at a point at which at least the private key of the public/private key pair is decrypted and a security-sensitive state of a boot system of the computing device at a point at which at least the private key of the public/private key pair was encrypted are the same security-sensitive state.

16. The computing device as recited in claim 13, the obtaining the public/private key pair comprising obtaining the public/private key pair at a time of creating the first security boundary.

17. The computing device as recited in claim 13, the obtaining the public/private key pair comprising obtaining the public/private key pair prior to creation of the first security boundary.

18. The computing device as recited in claim 13, the secure cryptoprocessor comprising a trusted platform module physical device.

19. The method as recited in claim 9, the obtaining the private key of the public/private key pair comprising generating the public/private key pair.

20. The computing device as recited in claim 13, the acts further comprising providing an event log identifying modules loaded and executed during the booting of the computing device to the remote device.

\* \* \* \* \*